US009682366B2

(12) United States Patent
Sigman et al.

(10) Patent No.: US 9,682,366 B2
(45) Date of Patent: *Jun. 20, 2017

(54) METHOD OF PRODUCING FCC CATALYSTS WITH REDUCED ATTRITION RATES

(71) Applicant: BASF Corporation, Florham Park, NJ (US)

(72) Inventors: Michael Sigman, Haddock, GA (US); Mitchell Willis, Bainbridge, GA (US); Kenneth Folmar, Lizella, GA (US)

(73) Assignee: BASF Corporation, Florham Park, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/196,241

(22) Filed: Jun. 29, 2016

(65) Prior Publication Data

US 2016/0303547 A1    Oct. 20, 2016

Related U.S. Application Data

(62) Division of application No. 13/919,225, filed on Jun. 17, 2013, now Pat. No. 9,403,161.

(51) Int. Cl.

| | | |
|---|---|---|
| *B01J 29/06* | (2006.01) | |
| *B01J 29/08* | (2006.01) | |
| *B01J 37/04* | (2006.01) | |
| *B01J 37/08* | (2006.01) | |
| *B01J 35/00* | (2006.01) | |
| *B01J 35/02* | (2006.01) | |
| *B01J 35/08* | (2006.01) | |
| *B01J 35/10* | (2006.01) | |
| *B01J 37/00* | (2006.01) | |
| *C01B 39/24* | (2006.01) | |
| *C10G 11/05* | (2006.01) | |
| *C10G 11/18* | (2006.01) | |

(52) U.S. Cl.
CPC ............. *B01J 29/06* (2013.01); *B01J 29/084* (2013.01); *B01J 29/088* (2013.01); *B01J 35/002* (2013.01); *B01J 35/023* (2013.01); *B01J 35/08* (2013.01); *B01J 35/1019* (2013.01); *B01J 35/1038* (2013.01); *B01J 35/1042* (2013.01); *B01J 35/1047* (2013.01); *B01J 37/0009* (2013.01); *B01J 37/0045* (2013.01); *B01J 37/04* (2013.01); *B01J 37/08* (2013.01); *C01B 39/24* (2013.01); *C10G 11/05* (2013.01); *C10G 11/18* (2013.01); *B01J 2229/186* (2013.01); *B01J 2229/64* (2013.01); *C10G 2300/70* (2013.01)

(58) Field of Classification Search
CPC .... B01J 2229/64; B01J 35/002; B01J 35/023; B01J 35/08; B01J 37/0045; B01J 29/084; B01J 29/088; C01B 39/24
USPC .................. 502/9, 60, 62, 63, 64, 65, 68, 79
See application file for complete search history.

(56) References Cited

U.S. PATENT DOCUMENTS

| | | | |
|---|---|---|---|
| 4,333,821 A | 6/1982 | Tu | |
| 4,767,466 A | 8/1988 | Nemeh et al. | |
| 5,330,943 A | 7/1994 | Shi | |
| 5,395,809 A | 3/1995 | Madon et al. | |
| 6,033,458 A | 3/2000 | Goodman et al. | |
| 6,916,757 B2 | 7/2005 | Ziebarth et al. | |
| 6,943,132 B2 | 9/2005 | Stockwell et al. | |
| 9,403,161 B2 * | 8/2016 | Sigman | ............ B01J 37/04 |
| 2003/0199386 A1 | 10/2003 | Stockwell et al. | |
| 2006/0293176 A1 | 12/2006 | Chang et al. | |
| 2011/0108462 A1 | 5/2011 | Chang | |
| 2013/0098804 A1 | 4/2013 | Chang et al. | |

FOREIGN PATENT DOCUMENTS

| | | |
|---|---|---|
| EP | 0325487 | 7/1989 |
| EP | 878233 | 11/1998 |

OTHER PUBLICATIONS

International Search Report dated Oct. 21, 2014.

* cited by examiner

*Primary Examiner* — Elizabeth Wood
(74) *Attorney, Agent, or Firm* — Lowenstein Sandler LLP

(57) ABSTRACT

FCC catalysts having improved attrition resistance are provided by mixing a cationic polyelectrolyte with either zeolite crystals or a zeolite-forming nutrient and/or a matrix material, prior to or during formation of a catalyst microsphere.

20 Claims, 4 Drawing Sheets

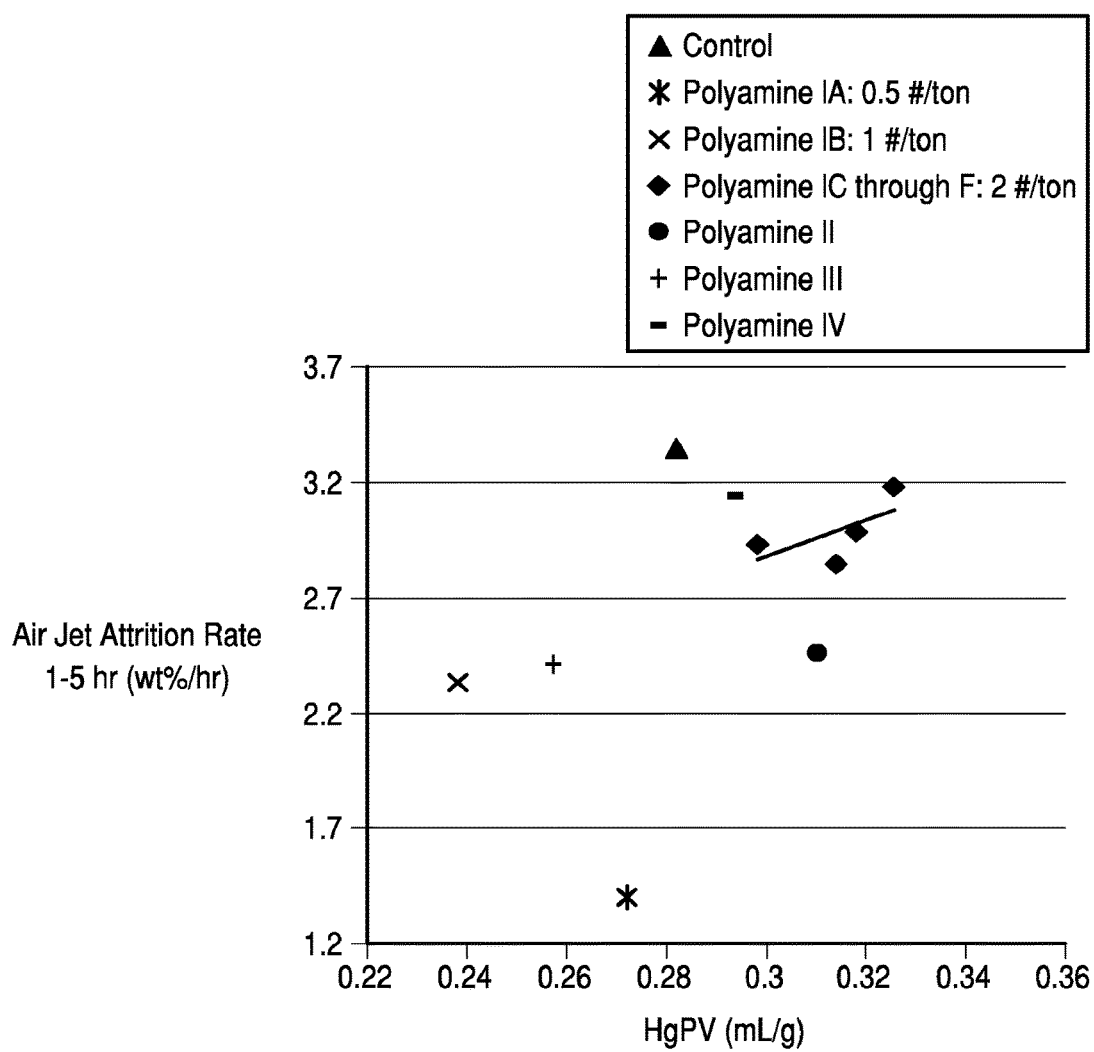

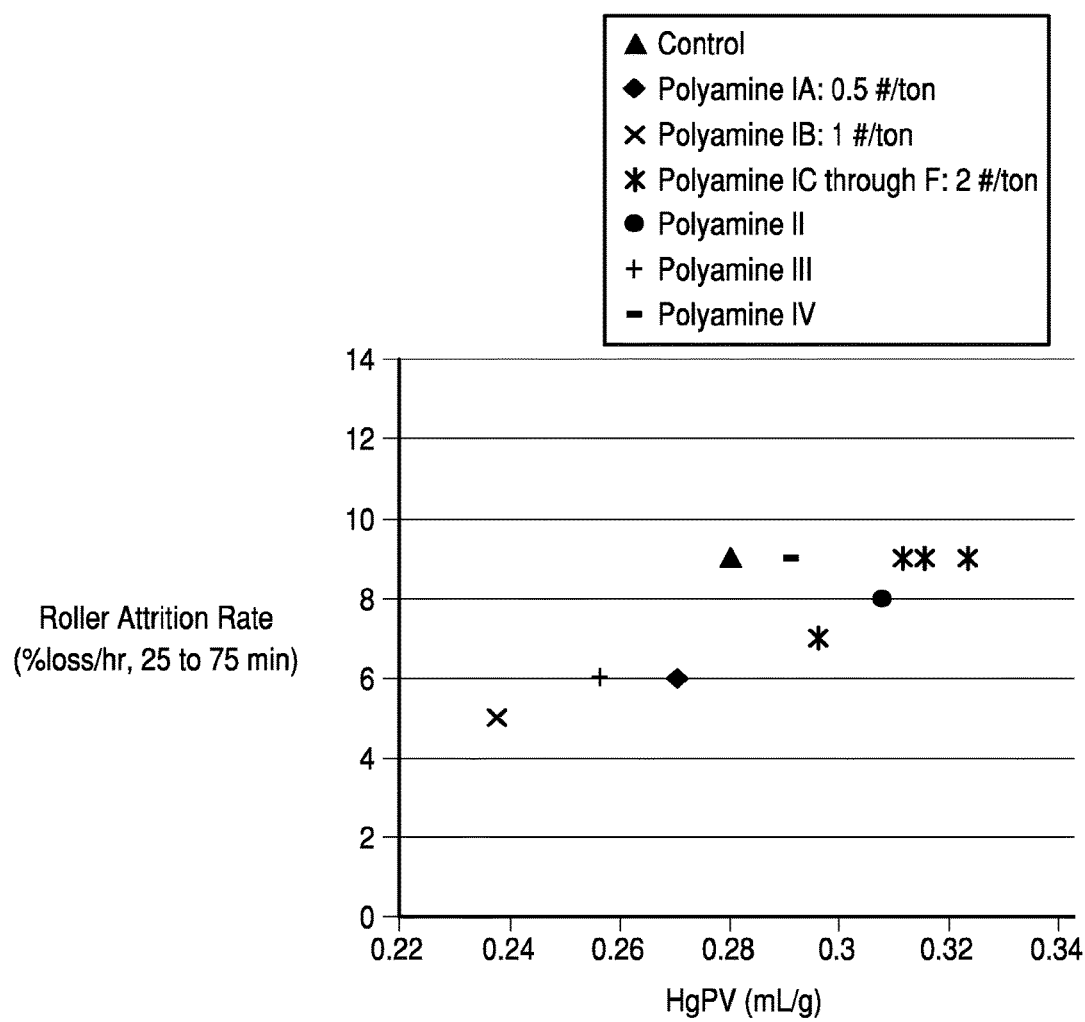

METHOD OF PRODUCING FCC CATALYSTS WITH REDUCED ATTRITION RATES

BACKGROUND OF THE INVENTION

The present invention relates to novel fluid catalytic cracking catalysts comprising microspheres containing Y-faujasite zeolite and having exceptionally high activity and other desirable characteristics, methods for making such catalysts and the use of such catalysts for cracking petroleum feedstocks, particularly under short residence time processes.

Since the 1960's, most commercial fluid catalytic cracking catalysts have contained zeolites as an active component. Such catalysts have taken the form of small particles, called microspheres, containing both an active zeolite component and a non-zeolite component. Frequently, the non-zeolitic component is referred to as the matrix for the zeolitic component of the catalyst. The non-zeolitic component is known to perform a number of important functions, relating to both the catalytic and physical properties of the catalyst. Oblad described those functions as follows: "The matrix is said to act as a sink for sodium in the sieve thus adding stability to the zeolite particles in the matrix catalyst. The matrix serves the additional function of: diluting the zeolite; stabilizing it towards heat and steam and mechanical attrition; providing high porosity so that the zeolite can be used to its maximum capacity and regeneration can be made easy; and finally it provides the bulk properties that are important for heat transfer during regeneration and cracking and heat storage in large-scale catalytic cracking." A. G. Oblad Molecular Sieve Cracking Catalysts, The Oil And Gas Journal, 70, 84 (Mar. 27, 1972).

In prior art fluid catalytic cracking catalysts, the active zeolitic component is incorporated into the microspheres of the catalyst by one of two general techniques. In one technique, the zeolitic component is crystallized and then incorporated into microspheres in a separate step. In the second technique, the in-situ technique, microspheres are first formed and the zeolitic component is then crystallized in the microspheres themselves to provide microspheres containing both zeolitic and non-zeolitic components.

It has long been recognized that for a fluid catalytic cracking catalyst to be commercially successful, it must have commercially acceptable activity, selectivity, and stability characteristics. It must be sufficiently active to give economically attractive yields, it must have good selectivity towards producing products that are desired and not producing products that are not desired, and it must be sufficiently hydrothermally stable and attrition resistant to have a commercially useful life.

Generally, FCC is commercially practiced in a cyclic mode. During these operations, the hydrocarbon feedstock is contacted with hot, active, solid particulate catalyst without added hydrogen, for example, at pressures of up to about 50 psig and temperatures up to about 650.degree. C. The catalyst is a powder with particle sizes of about 20-200 microns in diameter and with an average size of approximately 60-100 microns. The powder is propelled upwardly through a riser reaction zone, fluidized and thoroughly mixed with the hydrocarbon feed. The hydrocarbon feed is cracked at the aforementioned high temperatures by the catalyst and separated into various hydrocarbon products. As the hydrocarbon feed is cracked in the presence of cracking catalyst to form gasoline and olefins, undesirable carbonaceous residue known as "coke" is deposited on the catalyst. The spent catalyst contains coke as well as metals that are present in the feedstock. Catalysts for FCC are typically large pore aluminosilicate compositions, including faujasite or zeolite Y.

The coked catalyst particles are separated from the cracked hydrocarbon products, and after stripping, are transferred into a regenerator where the coke is burned off to regenerate the catalyst. The regenerated catalyst then flows downwardly from the regenerator to the base of the riser.

These cycles of cracking and regeneration at high flow rates and temperatures have a tendency to physically break down the catalyst into even smaller particles called "fines". These fines have a diameter of up to 20 microns as compared to the average diameter of the catalyst particle of about 60 to about 100 microns. In determining the unit retention of catalysts, and accordingly their cost efficiency, attrition resistance is a key parameter. While the initial size of the particles can be controlled by controlling the initial spray drying of the catalyst, if the attrition resistance is poor, the catalytic cracking unit may produce a large amount of the 0-20 micron fines which should not be released into the atmosphere. Commercial catalytic cracking units include cyclones and electrostatic precipitators to prevent fines from becoming airborne. Those skilled in the art also appreciate that excessive generation of catalyst fines increases the cost of catalyst to the refiner. Excess fines can cause increased addition of catalyst and dilution of catalytically viable particles.

U.S. Pat. No. 4,493,902, the teachings of which are incorporated herein by cross-reference, discloses novel fluid cracking catalysts comprising attrition-resistant, high zeolitic content, catalytically active microspheres containing more than about 40%, preferably 50-70% by weight Y faujasite and methods for making such catalysts by crystallizing more than about 40% sodium Y zeolite in porous microspheres composed of a mixture of two different forms of chemically reactive calcined clay, namely, metakaolin (kaolin calcined to undergo a strong endothermic reaction associated with dehydroxylation) and kaolin clay calcined under conditions more severe than those used to convert kaolin to metakaolin, i.e., kaolin clay calcined to undergo the characteristic kaolin exothermic reaction, sometimes referred to as the spinel form of calcined kaolin. In a preferred embodiment, the microspheres containing the two forms of calcined kaolin clay are immersed in an alkaline sodium silicate solution, which is heated, preferably until the maximum obtainable amount of Y faujasite is crystallized in the microspheres.

In practice of the '902 technology, the porous microspheres in which the zeolite is crystallized are preferably prepared by forming an aqueous slurry of powdered raw (hydrated) kaolin clay ($Al_2O_3:2SiO_2:2H_2O$) and powdered calcined kaolin clay that has undergone the exotherm together with a minor amount of sodium silicate which acts as fluidizing agent for the slurry that is charged to a spray dryer to form microspheres and then functions to provide physical integrity to the components of the spray dried microspheres. The spray dried microspheres containing a mixture of hydrated kaolin clay and kaolin calcined to undergo the exotherm are then calcined under controlled conditions, less severe than those required to cause kaolin to undergo the exotherm, in order to dehydrate the hydrated kaolin clay portion of the microspheres and to effect its conversion into metakaolin, this resulting in microspheres containing the desired mixture of metakaolin, kaolin calcined to undergo the exotherm and sodium silicate binder. In illustrative examples of the '902 patent, about equal weights of hydrated clay and spinel are present in the spray dryer feed and the resulting calcined microspheres contain somewhat more clay that has undergone the exotherm than metakaolin. The '902 patent teaches that the calcined microspheres comprise about 30-60% by weight metakaolin and about 40-70% by weight kaolin characterized through its characteristic exotherm. A less preferred method described in the patent, involves spray drying a slurry containing a mixture of kaolin clay previously calcined to metakaolin condition and kaolin calcined to undergo the exotherm but without including any hydrated kaolin in the slurry, thus providing microspheres containing both metakaolin and kaolin calcined to undergo the exotherm directly, without calcining to convert hydrated kaolin to metakaolin.

In carrying out the invention described in the '902 patent, the microspheres composed of kaolin calcined to undergo the exotherm and metakaolin are reacted with a caustic enriched sodium silicate solution in the presence of a crystallization initiator (seeds) to convert silica and alumina in the microspheres into synthetic sodium faujasite (zeolite Y). The microspheres are separated from the sodium silicate mother liquor, ion-exchanged with rare earth, ammonium ions or both to form rare earth or various known stabilized forms of catalysts. The technology of the '902 patent provides means for achieving a desirable and unique combination of high zeolite content associated with high activity, good selectivity and thermal stability, as well as attrition-resistance.

The aforementioned technology has met widespread commercial success. Because of the availability of high zeolite content microspheres which are also attrition-resistant, custom designed catalysts are now available to oil refineries with specific performance goals, such as improved activity and/or selectivity without incurring costly mechanical redesigns. A significant portion of the FCC catalysts presently supplied to domestic and foreign oil refiners is based on this technology. Refineries whose FCC units are limited by the maximum tolerable regenerator temperature or by air blower capacity seek selectivity improvements resulting in reductions in coke make while the gas compressor limitations make catalysts that reduce gas make highly desirable. Seemingly a small reduction in coke can represent a significant economic benefit to the operation of an FCC unit with air blower or regenerator temperature limitations.

The activity and selectivity characteristics of the catalysts formed by the process of the '902 patent are achieved even though, in general, the catalysts have relatively low total porosity as compared to fluid catalytic cracking catalysts prepared by incorporating the zeolite content into a matrix. In particular, the microspheres of such catalysts, in some cases, have a total porosity of less than about 0.15 cc/g. or even less than about 0.10 cc/g. In general, the microspheres of the '902 patent have a total porosity of less than 0.30 cc/g. As used herein, "total porosity" means the volume of pores having diameters in the range of 35-20,000 Å, as determined by the mercury porosimetry technique. The '902 patent noted that it was surprising that microspheres having a total porosity of less than about 0.15 cc/g. exhibit the activity and selectivity characteristics found. For example, such a result is contrary to the prior art disclosures that low pore volumes "can lead to selectivity losses due to diffusional restrictions."

It is believed that the relatively low porosity of the catalyst microspheres formed as in the '902 patent does not adversely affect activity and selectivity characteristics, since the microspheres of the '902 patent are not diffusion limited relative to the typical FCC processing conditions which were used at the time of the patent. In particular, catalyst contact time with the feed to be cracked was typically 5 seconds or more. Thus, while typical FCC catalysts formed by mechanically incorporating the zeolite within a matrix may have been more porous, the reaction time in prior art FCC risers did not yield any advantage in activity or selectivity. This result inspired the conclusion that transport processes were not at all limiting in FCC catalysts, at least outside the zeolite structure. Assertions made to the contrary were inconsistent with the facts and easily dismissed as self-serving. Importantly, the attrition resistance of the microspheres prepared in accordance with the '902 patent was superior to the conventional FCC catalysts in which the crystallized zeolite catalytic component was physically incorporated into the non-zeolitic matrix.

Recently, however, FCC apparatus have been developed which drastically reduce the contact time between the catalyst and the feed which is to be cracked. Conventionally, the reactor is a riser in which the catalyst and hydrocarbon feed enter at the bottom of the riser and are transported through the riser. The hot catalyst effects cracking of the hydrocarbon during the passage through the riser and upon discharge from the riser, the cracked products are separated from the catalyst. The catalyst is then delivered to a regenerator where the coke is removed, thereby cleaning the catalyst and at the same time providing the necessary heat for the catalyst in the riser reactor. The newer riser reactors operate at lower residence time and higher operating temperatures to minimize coke selectivity and delta coke. Several of the designs do not even employ a riser, further reducing contact time to below one second. Gasoline and dry gas selectivity can improve as a result of the hardware changes. These FCC unit modifications are marketed as valuable independent of the type of catalyst purchased, implying an absence of systematic problems in state of the art catalyst technology.

The processing of increasingly heavier feeds in FCC type processes and the tendency of such feeds to elevate coke production and yield undesirable products have also led to new methods of contacting the feeds with catalyst. The methods of contacting FCC catalyst for very short contact periods have been of particular interest. Thus, short contact times of less than 3 seconds in the riser, and ultra short contact times of 1 second or less have shown improvements in selectivity to gasoline while decreasing coke and dry gas production.

To compensate for the continuing decline in catalyst to oil contact time in FCC processing, the "equilibrium" catalysts in use have tended to become more active. Thus, increases in the total surface area of the catalyst need to be achieved and as well, the level of rare earth oxide promoters added to the catalysts are increasing. Moreover, cracking temperatures are rising to compensate for the reduction in conversion. Unfortunately, it has been found that the API gravity of the bottoms formed during short contact time (SCT) often increases after a unit revamp, leading some to suggest that the heaviest portion of the hydrocarbon feed takes longer to crack. Further, while a high total surface area of the catalyst is valued, the FCC process still values attrition resistance. Accordingly, while not obvious to those participating in the art, it has become increasingly likely that an optimization of FCC catalysts for the new short contact time and ultra short contact time processing which is presently being used is needed.

It is now theorized, that under the short contact time processing of hydrocarbons, further improvements can be gained by eliminating diffusion limitations that may still exist in current catalysts. This is being concluded even as these materials excel at the application. It is theorized that improvements in these catalysts may be produced by optimization of catalyst porosity and the elimination of active site occlusion and diffusional restrictions of the binder phases present in catalysts prepared by the so-called incorporation method.

In commonly assigned U.S. Pat. No. 6,943,132, it has been found that if the non-zeolite, alumina-rich matrix of the catalyst is derived from an ultrafine hydrous kaolin source having a particulate size such that 90 wt. % of the hydrous kaolin particles are less than 2 microns, and which is pulverized and calcined through the exotherm, a macroporous zeolite microsphere can be produced.

The ultrafine hydrous kaolin is dried in a spray dryer, or suitable unit operation, then deagglomerated using high energy pulverizers, or dry milling procedures. This unit operation is practiced to reduce agglomerates and return calciner feed to a particle size similar to what was measured in a slurry as noted above. The presence of agglomerated structures alter the particle size and bulk density properties of the calcined kaolin. During phase change from hydrous kaolin, agglomeration and sintering occurs. The measured particle size coarsens throughout the particle size ranges. Large agglomerated structures have higher density thus lower porosity. Structuring prior to calcination expands the pore volume by cementing particle contact points, which in fully calcined kaolins are theoretically maintained by expelled amorphous silica. The thermal transition to spinel expels one mol of silica per mol of spinel formed. Mullite transition from spinel expels four additional mols.

More generally, the FCC catalyst matrix useful in this invention to achieve FCC catalyst macroporosity is derived from alumina sources, such as kaolin calcined through the exotherm, that have a specified water pore volume, which distinguishes over prior art calcined kaolin used to form the catalyst matrix. The water pore volume is derived from an Incipient Slurry Point (ISP) test, which is described in the patent.

The morphology of the microsphere catalysts which are formed according to U.S. Pat. No. 6,943,132 is unique relative to the in-situ microsphere catalysts formed previously. Use of a pulverized, ultrafine hydrous kaolin calcined through the exotherm yields in-situ zeolite microspheres having a macroporous structure in which the macropores of the structure are essentially coated or lined with zeolite subsequent to crystallization. Macroporosity as defined herein means the catalyst has a macropore volume in the pore range of 600-20,000 Å of at least 0.07 cc/gm mercury intrusion. The catalysts also have a BET surface area less than 500 $m^2/g$. The novel catalyst is optimal for FCC processing, including the short contact time processing in which the hydrocarbon feed is contacted with a catalyst is for times of about 3 seconds or less.

High porosity within the microsphere is important to maximize catalytic activity by eliminating typical rate reductions due to diffusion of the crude oil molecules within the microsphere structure. As the porosity of a microsphere is increased, however, the rate at which the microsphere fractures and attrits into finer particles within the FCC unit operating environment increases; resulting in increased fresh catalyst addition rates and increased particulate emission from the unit. Processing or compositional mechanisms for reducing the rate at which an FCC catalyst attrits for a given total pore volume is of fundamental importance to improving the performance and corresponding value of the catalyst.

SUMMARY OF THE INVENTION

Improved attrition resistance is provided to in-situ formed FCC catalysts by adding a cationic polyelectrolyte to a kaolin slurry, prior to processing into a microsphere substrate for subsequent zeolite growth.

BRIEF DESCRIPTION OF THE DRAWINGS

FIG. 3 is a plot of air jet attrition results for inventive and comparative catalysts relative to the pore volume of the catalysts.

FIG. 4 is a plot of Roller attrition results relative to catalyst pore volume.

DETAILED DESCRIPTION OF THE INVENTION

Figure 1:
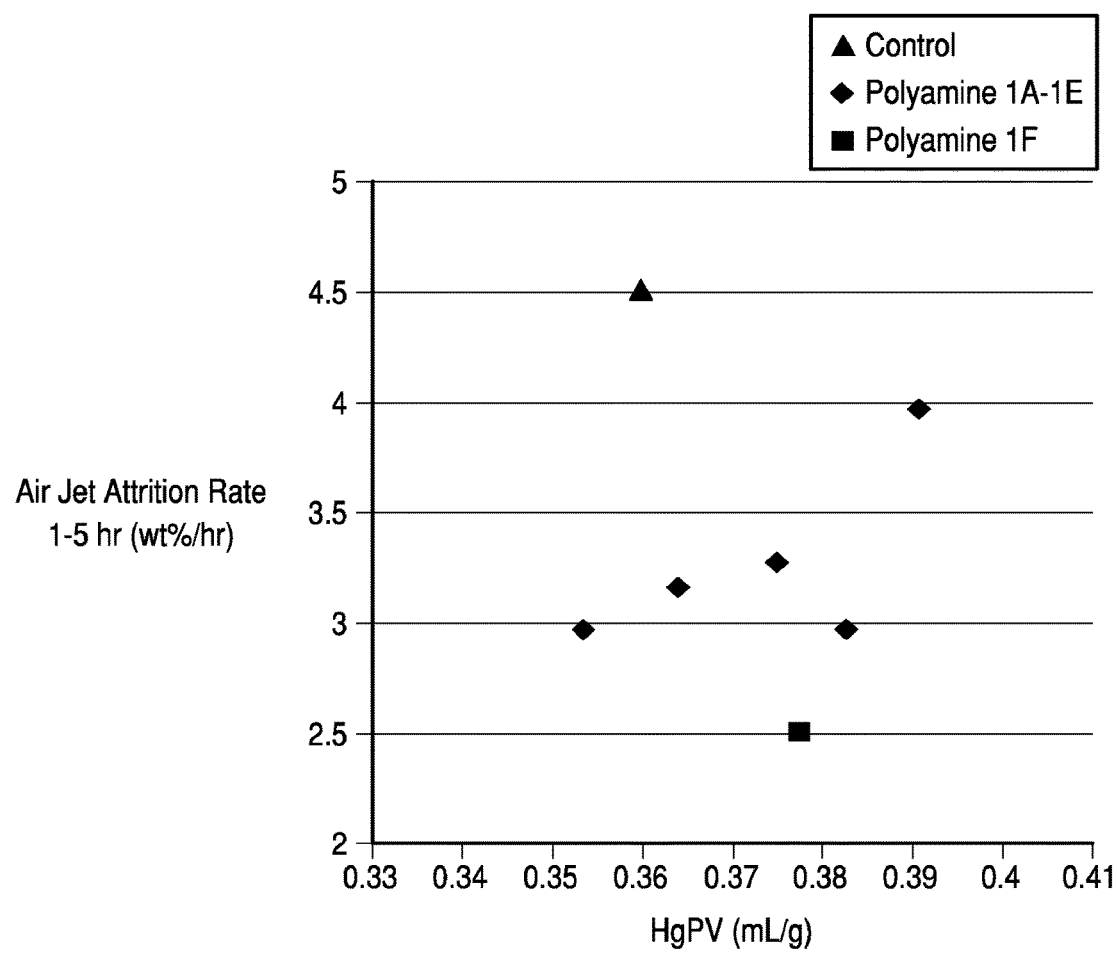
FIG. 1 is a plot of air jet attrition results for inventive and comparative catalysts relative to the pore volume of the catalysts.

The catalyst microspheres of this invention are produced by the general process as disclosed in commonly assigned U.S. Pat. No. 4,493,902. It is preferred, although not required, that the non-zeolitic, alumina-rich matrix of the catalysts of the present invention be derived from a hydrous kaolin source that is in the form of an ultrafine powder in which at least 90 wt. % of the particles are less than 2.0 microns, preferably at least 70 wt. % less than 1 micron as disclosed in aforementioned U.S. Pat. No. 6,943,132. The ultrafine hydrous kaolin is pulverized and calcined through the exotherm. It is also within the scope of this invention that the zeolite microspheres be formed with an alumina-rich matrix derived from kaolin having a larger size, and which is calcined at least substantially through its characteristic exotherm. Satintone® No. 1, (a commercially available kaolin that has been calcined through its characteristic exotherm without any substantial formation of mullite) is a material used on a commercial basis to form the alumina-rich matrix. Satintone® No. 1 is derived from a hydrous kaolin in which 70% of the particles are less than 2 microns. Other sources used to form the alumina-rich matrix include finely divided hydrous kaolin (e.g., ASP® 600, a commercially available hydrous kaolin described in Engelhard Technical Bulletin No. TI-1004, entitled "Aluminum Silicate Pigments" (EC-1167)) calcined at least substantially through its characteristic exotherm. Booklet clay has found the most widespread commercial use and has met tremendous success worldwide.

The general procedure for manufacturing the FCC microspheres of this invention is well-known in the art and can be followed from the procedure disclosed in U.S. Pat. No. 4,493,902. As disclosed therein, an aqueous slurry of reactive finely divided hydrous kaolin and/or metakaolin and alumina-containing material, which forms the matrix such as the ultrafine kaolin that has been calcined through its characteristic exotherm, is prepared. The aqueous slurry is then spray dried to obtain microspheres comprising a mixture of hydrous kaolin and/or metakaolin and kaolin that has been calcined at least substantially through its characteristic exotherm to form the high-alumina matrix. Preferably, a moderate amount of sodium silicate is added to the aqueous slurry before it is spray dried to function as a binder between the kaolin particles.

The reactive kaolin of the slurry to form the microspheres can be formed of hydrated kaolin or calcined hydrous kaolin (metakaolin) or mixtures thereof. The hydrous kaolin of the feed slurry can suitably be either one or a mixture of ASP® 600 or ASP® 400 kaolin, derived from coarse white kaolin crudes. Finer particle size hydrous kaolins can also be used, including those derived from gray clay deposits, such as LHT R pigment. Purified water-processed kaolin clays from Middle Georgia have been used with success. Calcined products of these hydrous kaolins can be used as the metakaolin component of the feed slurry.

The novel microspheres demonstrating reduced rates of attrition are generally produced from a blend of hydrous kaolin particles and calcined kaolin particles. The composition of the blend is typically 25 parts to 75 parts hydrous kaolin and 75 to 25 parts calcined kaolin. Hydrous kaolin particles are approximately 0.20 to 10 microns in diameter as measured by Sedigraph that have been slurried in water in a solids range of 30 to 80 wt % as limited by process viscosity with an appropriate dispersant addition. Preferably 90 wt % or more of the particles are less than 2 micron in size. The calcined kaolin consists of kaolinite that has been heated past its exothermic crystalline phase transformation to form spinel (what some authorities refer to as a defect aluminum-silicon spinel or a gamma alumina phase) or mullite.

Silicate for the binder is preferably provided by sodium silicates with $SiO_2$ to $Na_2O$ ratios of from 1.5 to 3.5 and especially preferred ratios of from 2.88 to 3.22.

The binder is then added at a level of 0 to 15 wt % (when measured as $SiO_2$) prior to spray drying the slurry to form ceramic porous beads that average in particle size from 20 to 200 um. The spray dried beads are then heated beyond the kaolinite endothermic transition that initiates at 550° C. to form metakaolin. The resulting microspheres are then crystallized, base exchanged, calcined, and typically but not always based exchanged and calcined a second time.

A quantity (e.g., 1 to 30% by weight of the kaolin) of zeolite initiator may also be added to the aqueous slurry before it is spray dried. As used herein, the term "zeolite initiator" shall include any material containing silica and alumina that either allows a zeolite crystallization process that would not occur in the absence of the initiator or shortens significantly the zeolite crystallization process that would occur in the absence of the initiator. Such materials are also known as "zeolite seeds". The zeolite initiator may or may not exhibit detectable crystallinity by x-ray diffraction.

Adding zeolite initiator to the aqueous slurry of kaolin before it is spray dried into microspheres is referred to herein as "internal seeding". Alternatively, zeolite initiator may be mixed with the kaolin microspheres after they are formed and before the commencement of the crystallization process, a technique which is referred to herein as "external seeding".

The zeolite initiator used in the present invention may be provided from a number of sources. For example, the zeolite initiator may comprise recycled fines produced during the crystallization process itself. Other zeolite initiators that may be used include fines produced during the crystallization process of another zeolite product or an amorphous zeolite initiator in a sodium silicate solution. As used herein, "amorphous zeolite initiator" shall mean a zeolite initiator that exhibits no detectable crystallinity by x-ray diffraction.

The seeds may be prepared as disclosed by in U.S. Pat. No. 4,493,902. Especially preferred seeds are disclosed in U.S. Pat. No. 4,631,262.

After spray drying, the microspheres may be calcined directly, or alternatively acid-neutralized to further enhance ion exchange of the catalysts after crystallization. The acid-neutralization process comprises co-feeding uncalcined, spray dried microspheres and mineral acid to a stirred slurry at controlled pH. The rates of addition of solids and acid are adjusted to maintain a pH of about 2 to 7, most preferably from about 2.5 to 4.5 with a target of about 3 pH. The sodium silicate binder is gelled to silica and a soluble sodium salt, which is subsequently filtered and washed free from the microspheres. The silica gel-bound microspheres are then calcined. In either case, calcination is done at a temperature and for a time (e.g., for two hours in a muffle furnace at a chamber temperature of about 1,350° F.) sufficient to convert any hydrated kaolin component of the microspheres to meta kaolin, leaving the previously calcined kaolin components of the microspheres essentially unchanged. The resulting calcined porous microspheres comprise a mixture of metakaolin and kaolin clay calcined through its characteristic exotherm in which the two types of calcined kaolin are present in the same microspheres. Alternatively, any appropriate calcined alumina can replace the kaolin calcined through the exotherm as previously described.

Y-faujasite is allowed to crystallize by mixing the calcined kaolin microspheres with the appropriate amounts of other constituents (including at least sodium silicate and water), as discussed in U.S. Pat. No. 4,493,902, and then heating the resulting slurry to a temperature and for a time (e.g., to 200°-215° F. for 10-24 hours) sufficient to crystallize Y-faujasite in the microspheres. The prescriptions of U.S. Pat. No. 4,493,902 may be followed as written.

After the crystallization process is terminated, the microspheres containing Y-faujasite are separated from at least a substantial portion of their mother liquor, e.g., by filtration. It may be desirable to wash to microspheres by contacting them with water either during or after the filtration step. Retained silica is controlled in the synthesis product to different levels. The silica forms a silica gel that imparts functionality for specific finished product applications. The microspheres that are filtered contain Y-faujasite zeolite in the sodium form. Typically, the microspheres contain more than about 8% by weight $Na_2O$. To prepare the microspheres as active catalysts, a substantial portion of the sodium ions in the microspheres are replaced by ammonium or rare earth ions or both.

Ion exchange may be conducted by a number of different ion exchange methods. Preferably, the microspheres are first exchanged one or more times with an ammonium salt such as ammonium nitrate or sulfate solution at a pH of about 3. A typical design base exchange process would have multiple filter belts which process the product countercurrent to exchange solution flow. The number of equilibrium stages is determined by the total sodium to be removed and optimization of chemical cost. A typical process contains 3 to 6 equilibrium stages in each base exchange process. The ion exchange(s) with ammonium ions are preferably followed by one or more ion exchanges with rare earth ions at a pH of about 3. The rare earth may be provided as a single rare earth material or as a mixture of rare earth materials. Preferably, the rare earth is provided in the form on nitrates or chlorides. The preferred microspheres of the invention are ion exchanged to contain between 0% and 12% by weight REO, most preferably 1% to 5% by weight REO and less than about 0.5, more preferably as low as 0.1% by weight $Na_2O$. As is well known, an intermediate calcination will be required to reach these soda levels.

After ion exchange is completed, the microspheres are dried. Many dryer designs can be used including drum, flash, and spray drying. The procedure described above for ion exchanging the FCC microsphere catalysts of this invention is well-known and, as such, such process, per se, does not form the basis of this invention.

The present invention is directed to improving the attrition resistance of the zeolite-containing FCC catalyst formed by the process described above. To this end, a cationic polyelectrolyte is added to a kaolin slurry prior to processing into a microsphere substrate for subsequent zeolite growth. The cationic polyelectrolyte addition decreases the attrition rate of the resulting FCC catalyst as measured by air jet (ASTM method D5757-00) and Roller attrition tests relative to control catalyst samples generated without the polyelectrolyte addition at the same total catalyst pore volume. The exact mechanism resulting in the improved attrition is under investigation, but polyelectrolytes are known and utilized in paper coating and filling applications requiring the flocculation of hydrous and calcined kaolin particles. The addition of polyelectrolyte to the hydrous and calcined kaolin slurry blend is believed to impart localized structure through the formation of fine aggregates that is maintained through the spray drying and calcination steps of the microsphere formation process. The polyelectrolyte addition also enables reduction in the amount of binder (typically sodium silicate) needed without detrimentally decreasing the microsphere mechanical strength prior to zeolite Y crystallization.

The amount of the cationic polyelectrolyte added to the kaolin slurry is minimal and, yet, substantial improvement in attrition resistance has been found in the finished catalyst. Thus, amounts of about 0.1 to 10 lbs of polyelectrolyte per ton of dry kaolin (uncalcined and calcined) have been found to yield the desired results. More preferably, 0.5 to 2 lbs per ton, or 0.025 to 0.1 wt. %, polyelectrolyte to the total kaolin content on a dry basis is effectively added. It should be understood that the percentage of polyelectrolyte used is based on all kaolin solids present in the slurry used to form the microsphere, prior to zeolite crystallization. The specific process description relates to the use of the polyelectrolyte with hydrous and calcined kaolin slurries used to form microspheres, but is not limited to those materials. Incorporation of an appropriate polyelectrolyte with other metal oxide precursors that may be used as matrix or future zeolite nutrient may be used. Non-limiting examples include alumina, aluminum hydroxide, silica and alumina-silica materials such as clays. The application of the described invention utilizes the in situ FCC manufacturing approach, but could easily be translated to use within an incorporated catalyst process as well.

The cationic polyelectrolytes useful in this invention are known in the art as bulking agents to flocculate hydrous kaolin in paper filling and coating applications. Many such agents are also known as flocculants to increase the rate at which clay slurries filter. See, for example, U.S. Pat. Nos. 4,174,279 and 4,767,466. Useful cationic polyelectrolyte flocculants include polyamines, quaternary ammonium salts, diallyl ammonium polymer salts, dimethyl dially ammonium chloride (polydadmacs). Cationic polyelectrolyte flocculants are characterized by a high density of positive charge as determined by dividing the total number positive charges per molecule by the molecular weight (MW). The MW of the chemistries are estimated to be between 10,000 and 1,000,000 (e.g. between 50,000 and 250,000) with positive charge densities generally exceeding $1 \times 10^{-3}$. Such materials do not contain anionic groups such as carboxyl or carbonyl groups. While we do not wish to be limited by any particulars of the reaction mechanisms, we believe that the clay mineral cations such as $H^+$, $Na^+$, and $Ca^{++}$ are replaced with the positively charged polymeric portion of the cationic polyelectrolyte at the original mineral cation location and that this replacement reduces the negative charge on the clay particles which in turn leads to coalescence by mutual attraction. Charge centers near the end of the polymer chain react and bridge with neighboring particles until the accessible clay cation exchange centers or the polymer charge centers are exhausted. The bridging strengthens the bond between the particles, thereby providing a highly shear resistant, bulked clay mineral composition. The presence of chloride ions in the filtrate in the case of dimethyldiallyl ammonium chloride may be an indication that at least one stage of the reaction between clay particles and quaternary salt polymer occurs by an ion-exchange mechanism.

The Kemira Superfloc C-500 series polyamines are liquid, cationic polymers of differing molecular weights. They work effectively as primary coagulants and charge neutralization agents in liquid-solid separation processes in a wide variety of industries. The chemistry range available ensures there is a product suitable for each individual application. Many, if not all of the above products have branched polymer chains.

MAGNAFLOC LT7989, LT7990 and LT7991 from BASF are also polyamines contained in about 50% solution and useful in this invention.

In addition to the alkyldiallyl quaternary ammonium salts, other quaternary ammonium cationic flocculants are obtained by copolymerizing aliphatic secondary amines with epichlorohydrin. Still other water-soluble cationic polyelectrolytes are poly (quaternary ammonium) polyether salts that contain quaternary nitrogen in the polymeric backbone and are chain extended by ether groups. They are prepared from water-soluble poly (quaternary ammonium salts) containing pendant hydroxyl groups and bifunctionally reactive chain extending agents; such polyelectrolytes are prepared by treating an $N,N,N^{(1)},N^{(1)}$ tetraalkylhydroxy-alkylenediamine and an organic dihalide such as dihydroalkane or a dihaloether with an epoxy haloalkane. Such polyelectrolytes and their use in flocculating clay are disclosed in U.S. Pat. No. 3,663,461.

Example 1

Inventive samples were generated by blending hydrous and calcined kaolin slurries consisting of 37.5 dry wt. % hydrous kaolin and 62.5 dry wt. % calcined kaolin to a total slurry solids level of ~50% by weight. The physical properties of note related to the hydrous and calcined kaolin components are detailed in Tables 1 and 2. The +325 mesh residue is the coarse material that does not pass through a 325 mesh screen (44 um spacing between screen mesh). The %<1 um and %<2 um classifications are the wt. % of the particles less than 1 or 2 um in equivalent spherical diameter as measured by Sedigraph 5200. The calcined kaolin consists of material that has been heated beyond the characteristic exothermic transition that initiates at ~950° C. to form what is often referred to as the spinel phase or the mullite phase or a combination of the two phases. The Mullite index (MI) is the ratio of the mullite peak in the kaolin sample to a 100% mullite reference sample indicating the degree of heat treatment for the calcined kaolin. The apparent bulk density (ABD) is the weight per unit volume of the material including the void fraction. The tamped bulk density (TBD) is a measure of the bulk density following work input to encourage more efficient particle packing as measured with a TAP-PACK Volumeter (ISO 787-11).

TABLE 1

Physical properties of hydrous kaolin used in inventive and comparative sample preparations.

| Material | +325 mesh residue | % <1 um |
|---|---|---|
| Hydrous kaolin | <0.5% | 76 to 80 |

TABLE 2

Physical properties of calcined kaolin used in
inventive and comparative sample preparations

| Material | MI | ABD | TBD | +325 mesh residue | % <2 um | % <1 um |
|---|---|---|---|---|---|---|
| Calcined kaolin | 30 to 45 | 0 to 0.5 | 0.4 to 0.5 | 0 to 5 | 60 to 75 | 35 to 50 |

Superfloc C577 (cationic polyamine) per ton of dry clay (both hydrous and calcined) was mixed using a standard air powered mixer into the slurry at a dosage of 1.0 dry pound of polymer per ton of dry clay. The polyamine was diluted to 1% solids prior to dosing the kaolin slurry. Sodium silicate grade #40 (3.22 modulus or 3.22 parts $SiO_2$ per 1.0 parts of $Na_2O$) was added as a binder at a dosage of 4 wt. % on an $SiO_2$ basis. Alternatively, inventive samples were generated containing no binder, 0 wt. % on an $SiO_2$ basis addition of sodium silicate. The slurry was spray dried to form microspheres with an average particle size (APS) of 80 to 90 microns as measured by laser particle size analysis (Microtrac SRA 150). The drying method was selected for convenience and other drying methods would be equally effective to reduce product moisture to below 2% by weight (OEM Labwave 9000 moisture analyzer). The resulting microspheres were calcined in a laboratory furnace at 815° C. (1500° F.) for 1 hour.

The comparative sample was generated from the same kaolin starting components using the same procedure except that the cationic polyamine was not added and twice the amount of sodium silicate (8 wt. % on $SiO_2$ basis to kaolin) was added to the material. Inventive samples I through IE were generated with varying dosages of nutrient metakaolin microspheres added in order to vary resulting microsphere total pore volume.

Following microsphere formation, zeolite crystallization was performed using the following compositions identified in Table 3 where seeds were fine alumino-silicate particles used to initiate zeolite crystallization and growth. Sodium silicate with a composition of 21.6 wt % $SiO_2$ and 11.6 wt % $Na_2O$ (1.87 modulus as defined as parts $SiO_2$ to parts $Na_2O$) was recycled and generated from commercial production of microsphere. Nutrient microspheres, consisting primarily of metakaolin which are soluble in the basic crystallization environment, served as a nutrient source for continued zeolite Y growth. The seeds used to initiate zeolite crystallization are described in U.S. Pat. No. 4,493,902, and especially preferred 4,631,262.

The following procedure was taken directly from US Publication No. 2012/0228194 A1. The Y-faujasite was allowed to crystallize by mixing the calcined kaolin microspheres with the appropriate amounts of other constituents (including at least sodium silicate and water), as disclosed in U.S. Pat. No. 5,395,809, the teachings of which are herein incorporated by reference, and then heating the resulting slurry to a temperature and for a time (e.g., to 200° to 215° F. for 10-24 hours) sufficient to crystallize Y-faujasite in the microspheres. The microspheres were crystallized to a desired zeolite content (typically ca. 50-65), filtered, washed, ammonium exchanged, exchanged with rare-earth cations, calcined, exchanged a second time with ammonium ions, and calcined for a second time.

Table 4 lists the physical properties of the resulting samples following crystallization and the subsequent rounds of ion exchange and calcination. The sample labeled "Control" contained no polyamines. Inventive examples are labeled Polyamine: 1A-1F. Total surface area (TSA), matrix surface area (MSA), and zeolite surface area (ZSA) were determined by BET analysis of nitrogen adsorption isotherms using a Micromeritics TriStar or TriStar 2 instrument. While the samples formed in this example yielded high activity/high surface area catalysts, the invention herein is not intended to be limited by the surface area or catalytic activity of the catalyst formed. This invention encompasses the improvement in attrition resistance regardless of the activity of the catalyst.

Following initial testing of the as produced catalysts, steaming was performed to simulate deactivated or equilibrium catalyst physical properties from a refinery. The process consists of steaming the catalyst at 1500° F. for 4 or more hours. Catalyst porosity was determined by the mercury porosimetry technique using a Micromeritics Autopore 4. Total pore volume is the cumulative volume of pores having diameters in the range of 35 to 20,000 Å. Unit cell size of the resulting zeolite Y crystallites was determined by the technique described in ASTM standard method of testing titled "Relative Zeolite Diffraction Intensities" (Designation D3906-80) or by an equivalent technique.

TABLE 3

FCC catalyst crystallization recipe

| | Control | Polyamine I: 1#/ton | Polyamine IB: 1#/ton | Polyamine IC: 1#/ton | Polyamine ID: 1#/ton | Polyamine 1E: 1#/ton | Polyamine 1F: 1#/ton, no binder |
|---|---|---|---|---|---|---|---|
| Seeds (g) | 75.0 | 75.0 | 75.0 | 75.0 | 75.0 | 75.0 | 75.0 |
| 1.87 modulus Sodium Silicate (g) | 697.0 | 826.5 | 870.8 | 915.2 | 959.9 | 1004.9 | 921.1 |
| 19% Caustic (g) | 96.4 | 92.5 | 84.5 | 76.5 | 68.4 | 60.3 | 83.0 |
| Water (g) | 150.0 | 135.7 | 138.1 | 140.6 | 143.0 | 145.4 | 122.1 |
| Microspheres (g) | 236.2 | 230.6 | 225.7 | 220.9 | 216.0 | 211.1 | 229.6 |
| Nutrient Microspheres (g) | 13.8 | 19.4 | 24.3 | 29.1 | 34.0 | 38.9 | 20.4 |

TABLE 4

| Catalyst physical properties | | | | | | | |
|---|---|---|---|---|---|---|---|
| | Control | Polyamine IA: 1 #/ton | Polyamine IB: 1 #/ton | Polyamine IC: 1 #/ton | Polyamine ID: 1 #/ton | Polyamine IE: 1 #/ton | Polyamine I: 1 #/ton, no binder |
| Total Surface Area (m2/g) | 376 | 385 | 385 | 362 | 371 | 392 | 392 |
| Matrix Surface Area (m2/g) | 86 | 92 | 93 | 90 | 94 | 97 | 91 |
| Zeolite Surface Area (m2/g) | 290 | 294 | 292 | 272 | 277 | 295 | 302 |
| Zeolite to matrix surface area ratio | 3.37 | 3.20 | 3.14 | 3.02 | 2.95 | 3.04 | 3.32 |
| Steamed Total Surface Area (m2/g) | 250 | 261 | 259 | 216 | 206 | 254 | 247 |
| Steamed Matrix Surface Area (m2/g) | 66 | 73 | 74 | 63 | 66 | 74 | 71 |
| Steamed Zeolite Surface Area (m2/g) | 183 | 188 | 184 | 153 | 140 | 180 | 176 |
| Steamed Zeolite to matrix surface area ratio | 2.77 | 2.58 | 2.49 | 2.43 | 2.12 | 2.43 | 2.48 |
| Total Pore Volume (cm3/g) | 0.359 | 0.382 | 0.390 | 0.375 | 0.364 | 0.353 | 0.377 |
| Unit Cell Size (Å) | 24.48 | 24.48 | | | | | 24.48 |

FIG. 1 is a plot of the air jet attrition results obtained for the inventive and comparative samples versus pore volume. Air jet attrition rate values were determined using an in-house unit following ASTM standard method D5757. For a given catalyst manufacturing method and composition, attrition rate increases as the porosity of the given catalyst particles is increased. Addition of the polyelectrolyte flocculant prior to microsphere formation modifies the packing of the resulting particles prior to microsphere formation resulting in a ceramic structure that is more resistant to attrition. In particular, the resulting novel catalyst structure exhibits increased resistance to attrition resulting from an abrasion type failure mechanism (attrition of small particles relative to the total size of the original particle). FIG. 1 illustrates the reduction observed in attrition rate for the inventive samples at equivalent or higher total pore volumes than the comparative example.

Figure 2:
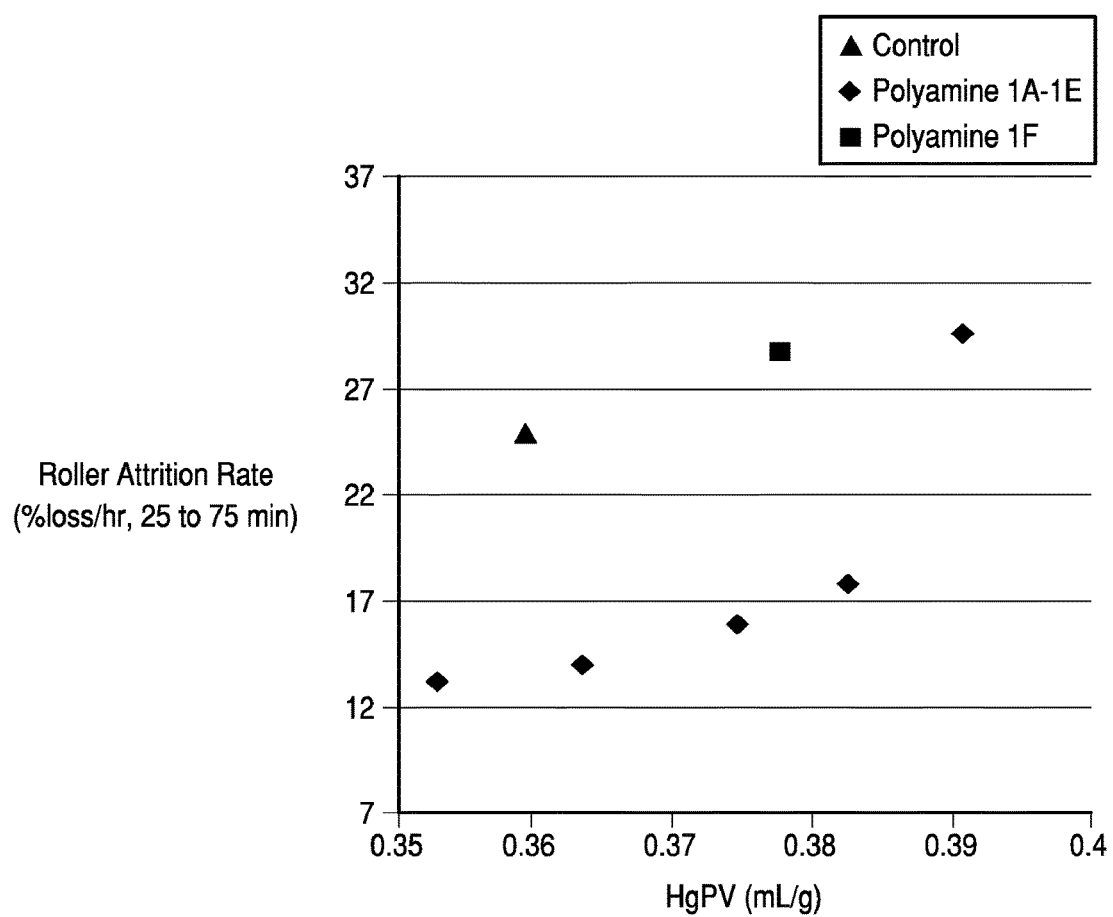
FIG. 2 is a plot of Roller attrition results relative to catalyst pore volume.

FIG. 2 is a plot of attrition results from a Roller Attrition Tester versus total catalyst pore volume. The Roller method is a more severe test resulting in increased catalyst attrition resulting from particle fracture (particle breakage into two or more large pieces of the original whole particle). Again, the inventive samples showed reduced attrition rate for an equivalent to increased total pore volume (up to 0.03 cm$^3$/g increased porosity). The inventive sample generated with no sodium silicate added as binder showed improved performance with respect to attrition resulting from abrasion, but was only comparable to the control in the more aggressive Roller testing. Given that population balance modeling of commercial FCC units indicates that abrasion is the predominant attrition mechanism versus fracture, the sample formed with polyamine and no binder is a step change improvement in performance relative to the comparative example.

Example 2

The same hydrous and calcined kaolin components were utilized to generate inventive microspheres with varying dosage of Superfloc C577 or with alternative cationic polyelectrolyte chemistries added. The polyamine addition was in the same manner as Example 1 with a reduced binder dosage of 4 wt % SiO$_2$ as sodium silicate. The comparative sample labeled "Control" was formed with 8 wt % SiO$_2$ as sodium silicate added prior to spray drying. Tables 5A and 5B contain the formulations utilized to crystallize each of the microsphere samples for processing to finished catalyst.

Inventive examples labeled Polyamine IA-IF were generated with Superfloc C577. Inventive samples labeled Polyamine IA through IC were generated with 0.5, 1.0, and 2.0 #/ton of polyamine added. Inventive samples labeled Polyamine IC through IF all contained 2.0 #/ton of Superfloc C577 charged, but were formulated to generate final catalysts with varying total porosity. Inventive sample Polyamine II was generated with 1 #/ton of SuperFloc C572 described commercially as a linear, low molecular weight polyamine. Inventive sample Polyamine III was generated with 1 #/ton of SuperFloc C573 described commercially as a branched, low molecular weight polyamine. Polyamine IV was generated with 1 #/ton of SuperFloc C581 described commercially as a branched, high molecular weight polyamine.

TABLE 5A

| FCC catalyst crystallization recipe | | | | | | | |
|---|---|---|---|---|---|---|---|
| | Control | Polyamine IA: 0.5 #/ton | Polyamine IB: 1#/ton | Polyamine IC: 2#/ton | Polyamine ID: 2#/ton | Polyamine IE: 2#/ton | Polyamine IF: 2#/ton |
| Seeds (g) | 60.0 | 60.0 | 60.0 | 60.0 | 60.0 | 60.0 | 60.0 |
| 1.87 mod Sodium Silicate (g) | 649.6 | 579.8 | 579.8 | 579.8 | 618.1 | 586.6 | 555.4 |

TABLE 5A-continued

FCC catalyst crystallization recipe

| | Control | Polyamine IA: 0.5 #/ton | Polyamine IB: 1#/ton | Polyamine IC: 2#/ton | Polyamine ID: 2#/ton | Polyamine IE: 2#/ton | Polyamine IF: 2#/ton |
|---|---|---|---|---|---|---|---|
| 19% Caustic (g) | 50.2 | 59.6 | 59.6 | 59.6 | 57.2 | 59.2 | 61.5 |
| Water (g) | 205.9 | 206.5 | 206.5 | 206.5 | 199.5 | 192.1 | 184.8 |
| Microspheres (g) | 176.7 | 177.8 | 177.8 | 177.8 | 180.6 | 184.5 | 188.4 |
| Nutrient Microspheres (g) | 23.3 | 22.2 | 22.2 | 22.2 | 19.4 | 15.5 | 11.6 |

TABLE 5B

FCC catalyst crystallization recipe

| | Polyamine II | Polyamine III | Polyamine IV |
|---|---|---|---|
| Seeds (g) | 60.0 | 60.0 | 60.0 |
| 1.87 mod Sodium Silicate (g) | 579.8 | 579.8 | 579.8 |
| 19% Caustic (g) | 59.6 | 59.6 | 59.6 |
| Water (g) | 206.5 | 206.5 | 206.5 |
| Microspheres (g) | 177.8 | 177.8 | 177.8 |
| Nutrient Microspheres (g) | 22.2 | 22.2 | 22.2 |

Tables 6A and 6B contain physical property data collected from each of the resulting catalyst final products. The attrition results as measured by air jet (FIG. 3) and Roller attrition (FIG. 4) demonstrate the improved performance of the inventive catalyst for a comparable total pore volume relative to the comparative examples.

TABLE 6A

Catalyst physical properties

| | Control | Polyamine IA: 0.5 #/ton | Polyamine IB: 1#/ton | Polyamine IC: 2#/ton | Polyamine ID: 2#/ton | Polyamine IE: 2#/ton | Polyamine IF: 2#/ton |
|---|---|---|---|---|---|---|---|
| TSA ($m^2/g$) | 406 | 417 | 404 | 448 | 397 | 388 | 388 |
| MSA ($m^2/g$) | 90 | 93 | 92 | 93 | 86 | 92 | 90 |
| ZSA ($m^2/g$) | 316 | 324 | 312 | 355 | 311 | 296 | 298 |
| Z/M ratio | 3.51 | 3.48 | 3.39 | 3.82 | 3.60 | 3.20 | 3.31 |
| STSA ($m^2/g$) | 257 | 280 | 260 | 284 | 249 | 252 | 257 |
| SMSA ($m^2/g$) | 69.0 | 67.0 | 71.0 | 69 | 70 | 71 | 72 |
| SZSA ($m^2/g$) | 189 | 213 | 188 | 215 | 179 | 181 | 185 |
| SZ/M ratio | 2.74 | 3.18 | 2.65 | 3.12 | 2.56 | 2.57 | 2.57 |
| Total Pore Volume ($cm^3/g$) | 0.2817 | 0.2719 | 0.2381 | 0.2981 | 0.3136 | 0.3176 | 0.3254 |
| Unit Cell Size (Å) | 24.51 | 24.5 | 24.53 | | | | |

TABLE 6B

Catalyst physical properties

| | Control | Polyamine II | Polyamine III | Polyamine IV |
|---|---|---|---|---|
| TSA ($m^2/g$) | 406 | 411 | 400 | 407 |
| MSA ($m^2/g$) | 90 | 97 | 86 | 93 |
| ZSA ($m^2/g$) | 316 | 314 | 314 | 314 |
| Z/M ratio | 3.51 | 3.24 | 3.65 | 3.38 |
| STSA ($m^2/g$) | 257 | 266 | 275 | 265 |
| SMSA ($m^2/g$) | 69.0 | 71.0 | 74.0 | 71.0 |
| SZSA ($m^2/g$) | 189 | 196 | 202 | 193 |
| SZ/M ratio | 2.74 | 2.76 | 2.73 | 2.72 |
| Total Pore Volume ($cm^3/g$) | 0.2817 | 0.3098 | 0.2572 | 0.2922 |
| Unit Cell Size (Å) | 24.51 | | | |

The invention claimed is:

1. An FCC zeolite-containing catalyst microsphere, the microsphere comprising zeolite, the microsphere having been formed from a slurry comprising a matrix and at least one of a zeolite-forming nutrient or zeolite crystals, the slurry having been mixed with, prior to or during formation of the microsphere, a cationic polyelectrolyte in an amount from 0.005 to 0.5 wt. % relative to a total weight of the matrix and the zeolite-forming nutrient or the zeolite crystals in the slurry, wherein the FCC zeolite-containing catalyst microsphere comprises a macroporous structure having a macropore volume in the pore range of 600 to 20,000 Å of about 0.07 cc/gm or more mercury intrusion.

2. The catalyst of claim 1, wherein the microsphere is 20 to 200 micrometers in diameter.

3. The catalyst of claim 1, wherein the microsphere is formed from the zeolite-forming nutrient and the matrix, and wherein the zeolite is formed in situ.

4. The catalyst of claim 3, wherein the zeolite-forming nutrient is metakaolin.

5. The catalyst of claim 4, wherein the matrix is formed from kaolin that has been calcined through its exotherm.

6. The catalyst of claim 1, wherein the cationic polyelectrolyte is selected from the group consisting of polyamines, quaternary ammonium salts, diallyl ammonium polymer salts, and dimethyl diallyl ammonium chloride.

7. The catalyst of claim 1, wherein the microsphere has a total pore volume ranging from about than 0.2381 cc/g to about 0.390 cc/g.

8. The catalyst of claim 6, wherein the polyamine is mixed with the zeolite-forming nutrient and the matrix.

9. The catalyst of claim 6, wherein the polyamine is mixed with the zeolite-forming nutrient and the matrix in an amount of from about 0.025 to 0.1 wt. %, relative to a total weight of the matrix and the zeolite-forming nutrient.

10. The method of claim 6, wherein the polyamine has a molecular weight of between 10,000 and 1,000,000.

11. A method of producing an FCC catalyst microsphere, the method comprising:
    forming a slurry comprising a matrix and zeolite crystals or kaolin;
    mixing with the slurry a cationic polyelectrolyte such that the cationic polyelectrolyte is present in the slurry in an amount from 0.005 to 0.5 wt. % relative to a total weight of the matrix and the zeolite crystals or kaolin in the slurry; and
    spray drying the slurry into microspheres,
    wherein the microsphere comprises a macroporous structure having a macropore volume in the pore range of 600 to 20,000 Å of about 0.07 cc/g or more mercury intrusion.

12. The method of claim 11, wherein the catalyst microsphere is 20 to 200 micrometers in diameter.

13. The method of claim 11, wherein the matrix is kaolin calcined through the exotherm.

14. The method of claim 11, wherein the cationic polyelectrolyte is a polyamine, and wherein the polyamine has a molecular weight of between 10,000 and 1,000,000.

15. The method of claim 11, wherein the cationic polyelectrolyte is present in the slurry in an amount from 0.025 to 0.1 wt. % relative to a total weight of the matrix and the zeolite crystals or kaolin in the slurry.

16. The method of claim 11, wherein the slurry contains hydrous kaolin and/or metakaolin, and the microspheres are reacted with a silicate to form zeolite crystals in situ.

17. The method of claim 11, wherein said matrix is kaolin calcined through the exotherm and is formed from an ultrafine hydrous kaolin having at least 90 wt. % of the particles less than 2 microns.

18. The method of claim 11, further comprising:
    reacting the microspheres with a silicate to form catalyst microspheres containing zeolite crystals formed in situ.

19. The method of claim 11, wherein the kaolin comprises one or more of hydrous kaolin or metakaolin.

20. The catalyst of claim 5, wherein the microsphere comprises 25 parts to 75 parts kaolin calcined through the exotherm and 75 parts to 25 parts metakaolin.

* * * * *